Aug. 2, 1966  M. C. DAVENPORT ETAL  3,264,044
ADJUSTABLE SHAFT SUPPORT
Filed Nov. 22, 1963  2 Sheets-Sheet 1

INVENTORS:
MARC C. DAVENORT
GEORGE B. HAMMOND
BY
Newton, Hopkins & Jones
ATTORNEYS Aug. 2, 1966  M. C. DAVENPORT ET AL  3,264,044
ADJUSTABLE SHAFT SUPPORT
Filed Nov. 22, 1963  2 Sheets-Sheet 2
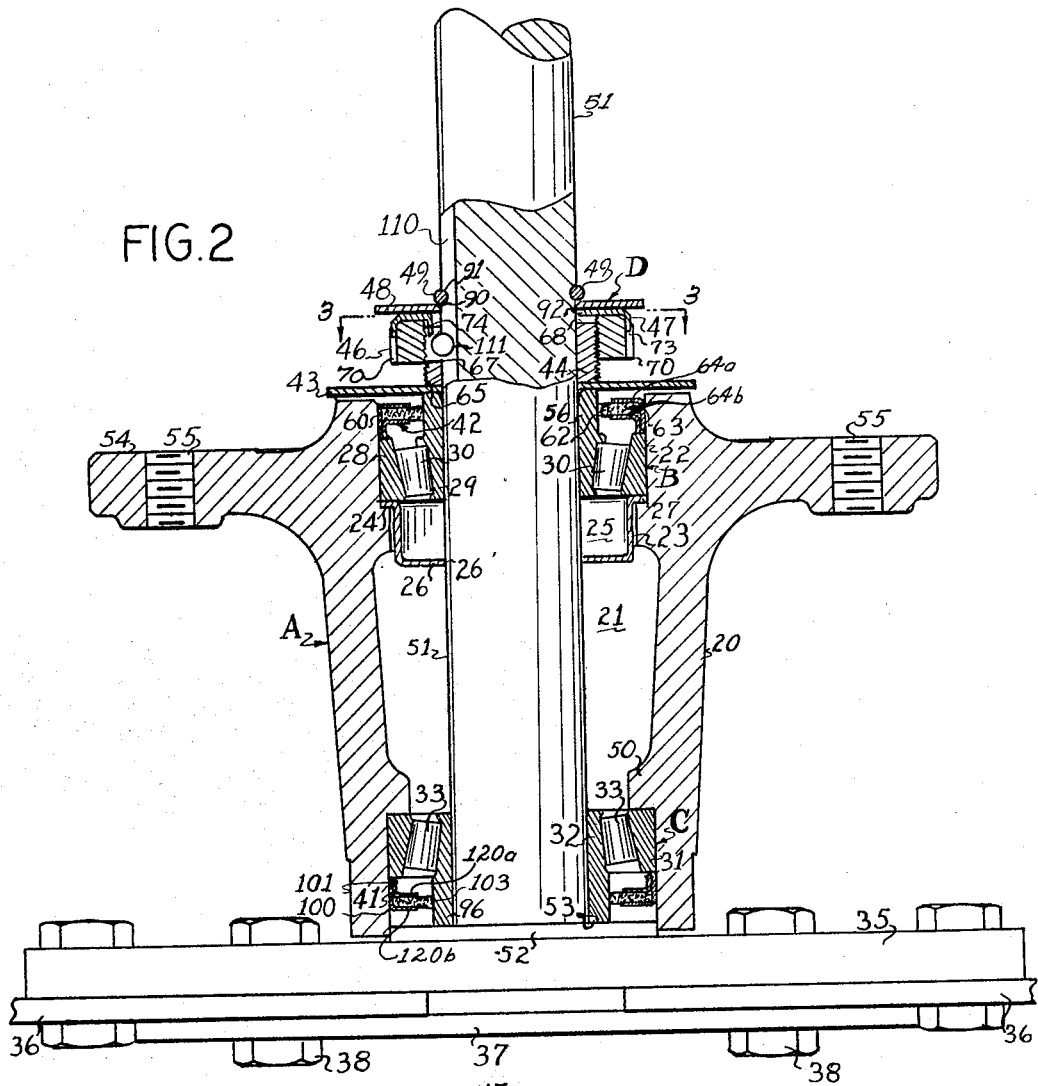
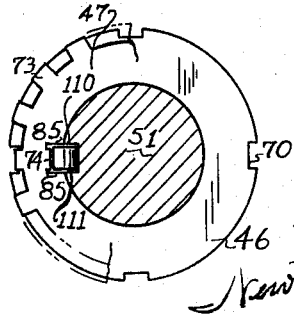
INVENTORS:
MARC C. DAVENPORT
GEORGE B. HAMMOND
BY
ATTORNEYS

United States Patent Office 3,264,044
Patented August 2, 1966

3,264,044
ADJUSTABLE SHAFT SUPPORT
Marc C. Davenport, Macon, Ga., and George B. Hammond, Rockford, Ill., assignors to Lilliston Implement Company, Albany, Ga., a corporation of Georgia
Filed Nov. 22, 1963, Ser. No. 325,726
9 Claims. (Cl. 308—227)

This invention relates to devices for rotatably supporting shafts and more particularly, to a device for rotatably supporting a shaft so that linear motion of the shaft can be adjustably eliminated.

There are many applications requiring the use of a shaft which is freely rotatable but which is fixed in position with respect to linear motion along its centerline. In the most of these applications, a shaft supporting device having an arrangement of roller bearings or ball bearings is used to permit the shaft to be freely rotatable while restricted as to linear motion along its centerline. However, in those applications of a rotatable shaft in which the weight of the shaft must be supported by the roller bearing or ball bearing arrangement or in which the shaft experiences thrust or must carry a load in the direction of its centerline, there is a tendency for the roller bearings or ball bearings of the shaft supporting device to become worn with use and for these previous shaft supporting devices to permit an increasing amount of linear motion of the shaft along its centerline. For applications of a rotatable shaft in which the shaft must be restricted as to linear motion along its centerline, this linear motion of the shaft along its centerline resulting from the wearing of roller bearings or ball bearings is highly undesirable.

Moreover, previous devices for rotatably supporting a shaft without linear motion along its centerline have been difficult and expensive to fabricate and manufacture. This is because these previous devices have generally avoided linear motion of the shaft before roller bearing or ball bearing wear has occurred by maintaining close tolerances between all parts as the devices are fabricated and assembled. It is difficult and expensive to fabricate and assemble these previous devices to close tolerances. These previous devices have had no easy and convenient means for eliminating the linear motion of a shaft whether resulting from failure to hold close tolerances during manufacture or from the wearing of roller bearings or ball bearings during use.

The shaft supporting device disclosed herein completely overcomes these difficulties with previous shaft supporting devices. It rotatably supports a shaft while providing adjustment means for completely eliminating linear motion of the shaft along its centerline after use has caused roller bearing wear. The adjustment means is also used when the shaft is initially positioned in the shaft supporting device and permits the device to be fabricated and assembled without maintaining close tolerances. As a result, the device is relatively inexpensive.

Moreover, the device has a relatively long useful life because the adjustment means permits linear motion of the shaft caused by use to be repeatedly eliminated as wear occurs. Thus, the shaft supporting device disclosed herein possesses many advantages in addition to the elimination of the linear shaft motion caused by wear which has characterized previous devices.

These improvements in devices for rotatably supporting a shaft while restricting its linear motion along its centerline are obtained by supporting the shaft within two conventional roller bearing cones and by adjusting the length of the device between fixed positions on the shaft so that the effective length of the device and the distance between the fixed shaft positions are equal regardless of manufacturing discrepancies or roller bearing wear. The fixed shaft positions limit the linear motion of the shaft within the shaft supporting device and when the device is simultaneously restricting shaft motion at both shaft positions because its length equals the distance between these fixed positions on the shaft, linear motion of the shaft within the device is prevented.

These and other features and advantages of the invention will be more clearly understood from the following detailed description and the accompanying drawings in which like characters of reference designate corresponding parts in all figures and in which:

FIG. 2 is a sectional view of the shaft supporting device taken substantially in the centerline of the shaft, but with the shaft shown largely in elevation.

FIG. 3 is a sectional view of the shaft supporting device taken in line 3—3 in FIG. 1 and with background details omitted for clarity.

Figure 1:
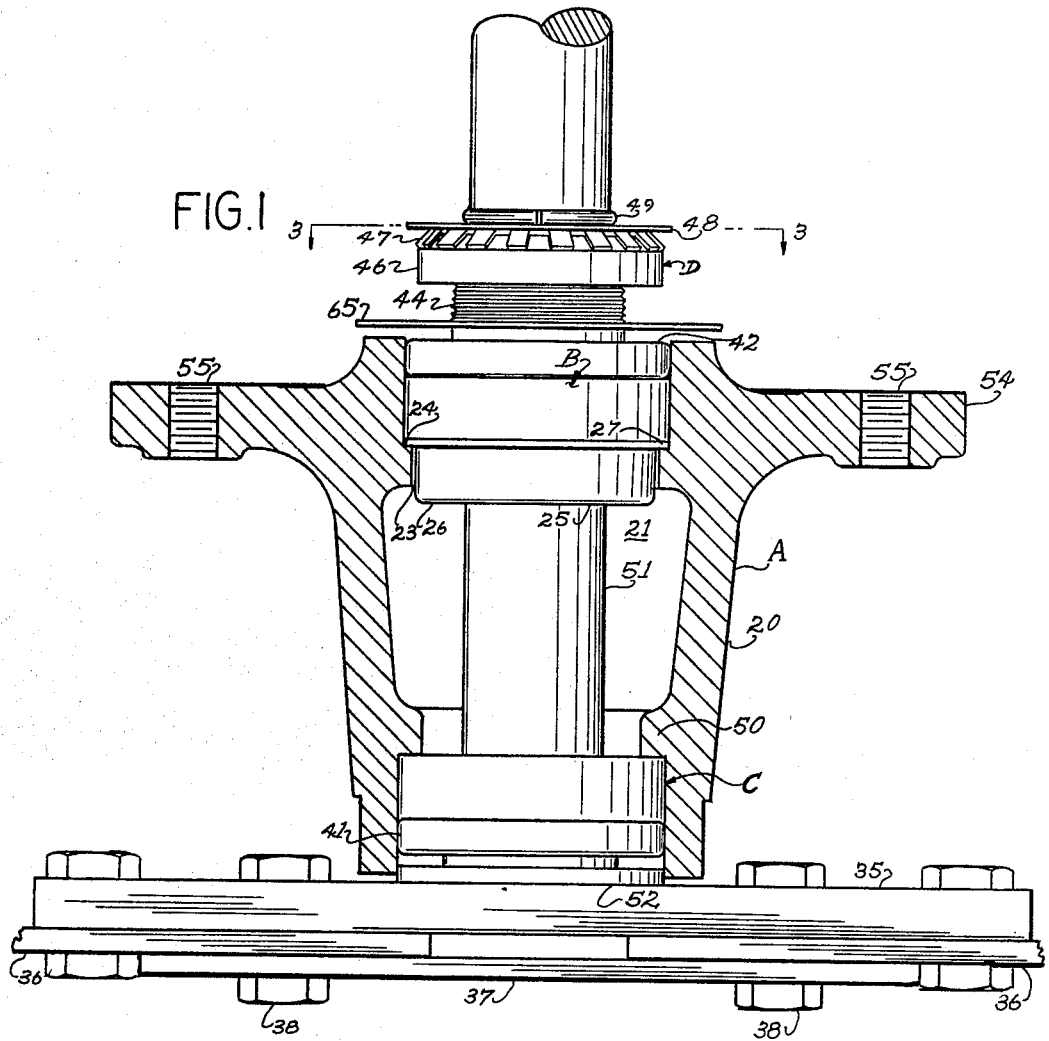
FIG. 1 is a side elevational view of the shaft supporting device with the hub in section to show the arrangement of the components within the hub.

These figures and the following detailed description disclose a preferred specific embodiment of the invention but the invention is not limited to the details disclosed since it may be embodied in other equivalent forms.

This invention is best understood as comprising a hub generally indicated by the letter A, an upper bearing cone generally indicated by the letter B, a lower bearing cone generally indicated by the letter C, and a shaft positioning mechanism generally indicated by the letter D. The hub A is a cylindrical shell 20 with a lower cylindrical cavity 21 extending into it from its lower end and an upper cylindrical cavity 22 extending into it from its upper end. The lower cylindrical cavity 21 and the upper cylindrical cavity 22 are joined by a circular passage 23. The centerlines of the lower cylindrical cavity 21, the upper cylindrical cavity 22 and the circular passage 23 coincide and the circular passage 23 has a smaller diameter than the upper cylindrical cavity 22 so that a shoulder 24 is formed where the upper cylindrical cavity 22 is continuous with the circular passage 23.

A cup 25 having a plate 26 at one end and a flange 27 at its other end is positioned within the circular passage 23 with the flange 27 engaging the shoulder 24 and with the plate 26 below the circular passage 23 in the lower cylindrical cavity 21. The plate 26 has a circular shaft passage 26' extending through it with the centerline of the shaft passage 26' coinciding with the centerline of the upper cylindrical cavity 22. The upper bearing cone B is positioned in the upper cylindrical cavity 22. The upper bearing cone B is a roller bearing assembly of conventional known type having a cylindrical outer ring 28, a cylindrical inner ring 29, and a plurality of cylindrical roller bearings 30 positioned between the outer ring 28 and the inner ring 29.

The upper bearing cone B is positioned within the upper cylindrical cavity 22 with the lower edge of the outer ring 28 engaging the flange 27 of the cup 25 which is in turn engaging the shoulder 24 of the hub A. The centerline of the inner ring 29 of the upper bearing cone B coincides with the centerline of the upper cylindrical cavity 22 and the centerlines of the roller bearings 30 are inclined inward and downward toward the centerline of the lower cylindrical cavity 21. The inclined positioning of the roller bearings 30 restricts in known manner the linear motion of the outer ring 28 and the inner ring 29 with respect to each while permitting the outer ring 28 and the inner ring 29 to be freely rotatable with respect to each other.

An annular ridge 50 is formed in the lower cylindrical cavity 21 adjacent to the lower end of the hub A and the lower bearing cone C is slidably inserted into the lower cylindrical cavity 21 until it engages the lower side of the annular ridge 50. The lower bearing cone C is of known construction similar to the construction of the upper bearing cone B and has a cylindrical outer ring 31, a cylindrical inner ring 32 and a plurality of cylindrical roller bearings 33 between the outer ring 31 and the inner ring 32. The lower bearing cone C is positioned within the lower cylindrical cavity 21 with the centerline of the lower bearing cone C coinciding with the centerline of the lower cylindrical cavity 21 and the centerlines of the roller bearings 33 are inclined inward and upward toward the centerline of the upper cylindrical cavity 22. This arrangement of the lower bearing cone C results in the outer ring 31 and the inner ring 32 being freely rotatable with respect to each other while restricting in known manner the linear motion of rings 31 and 32 with respect to each other.

The shaft 51 is slidably inserted through the upper bearing cone B, the shaft passage 26′ in the cup 25, and the lower bearing cone C, and the shaft 51 is rotatable within the hub A with rotation of the inner ring 29 of the upper bearing cone B and the inner ring 32 of the lower bearing cone C. The outer rings 28 and 31 of the bearing cones B and C remain stationary with the hub A. A disc 52 is attached to the lower end of the shaft 51 by welding or other known means. The disc 52 is perpendicular to the centerline of the shaft 51 and is circular with a diameter substantially equal to the diameter of the lower end of the lower cylindrical cavity 21. The shaft 51 is positioned with the disc 52 at its lower end extending into the lower cylindrical cavity 21 and engaging the lower edge 53 of the inner ring 32 of the lower bearing cone C. The disc 52 is attached to or integral with the structure which it is desired to rotate by the shaft 51.

In the specific embodiment of the invention illustrated in the figures, the disc 52 is integral with a blade carrier 35 and the cutting blade 36 of a rotary cutter (not shown) is positioned between the blade carrier 35 and a blade support 37 by extending bolts 38 through the blade carrier 35, the cutting blade 36 and the blade support 37. With this arrangement, rotation of the shaft 51 causes rotation of the cutting blade 36. The shaft 51 and the cutting blade 36 are positioned with respect to the rotary cutter (not shown) by bolting the hub A to the rotary cutter. In the specific embodiment of the invention shown in the figures, the hub A has an outer disc 54 concentric and integral with it and the hub A is attached to a structure such as a rotary cutter (not shown) by extending bolts (not shown) through a plurality of threaded bolt passages 55 in the outer disc 54.

An upper grease seal 42 is positioned in the upper cylindrical cavity 22 around the shaft 51 and around a portion 56 of the inner ring 29 of the upper bearing cone B which extends above the outer ring 28. The upper grease seal 42 is of known type having a metal shell with a circular edge 60 which engages the outer ring 28 of the upper bearing cone B. The upper grease seal 42 has a felt ring 63 between discs 64a and 64b. The felt ring 63 engages the shaft 51 and prevents the escape of grease from below the upper grease seal 42. With the cup 25, the upper grease seal 42 serves to define a grease chamber in which grease or other lubricating material is placed for lubricating in known manner the roller bearings 30 of the upper bearing cone B.

Positioned above the upper grease seal 42 around the shaft 51 is an upper washer 43. The upper washer 43 engages the upper edge 65 of that portion 56 of the inner ring 29 which extends above the outer ring 28 and the upper grease seal 42. The length of the inner ring 29 of the upper bearing cone B and the position of the shoulder 24 in the upper cylindrical cavity 22 are selected so that when the upper bearing cone B is engaging the flange 27 of the cup 25, the upper edge 65 of the inner ring 29 and the upper washer 43 are above the hub A. In the specific embodiment of the invention illustrated in the figures, the upper washer 43 has a diameter greater than that of the upper cylindrical cavity 22 and extends outward from the shaft 51 over the upper surface of the hub A. However, the positioning of the upper washer 43 by the upper edge 65 of the inner ring 29 places the upper washer 43 a sufficient distance above the upper surface of the hub A to prevent the upper washer 43 from engaging the upper surface of the hub A as the upper washer 43 rotates with the inner ring 29 of the upper bearing cone B and with the shaft 51.

Slidably positioned on the shaft 51 above the upper washer 43 is a cylindrical adjusting collar 44. The outer surface of the adjusting collar 44 is threaded and a slot 67 extends from the upper surface 68 of the adjusting collar 44 downward for a portion of the length of the adjusting collar 44. The slot 67 extends completely through the side of the adjusting collar 44 in which the slot 67 is placed and slot 67 is substantially rectangular in shape. Concentric with and having an inner surface threadably engaging the outer surface of the adjusting collar 44 is an adjusting nut 46. The adjusting nut 46 has a plurality of grooves 70 extending the entire length of its outer surface. Each groove 70 is substantially square in cross section and its depth is less than the thickness of side of adjusting nut 46. Rotation of the adjusting nut 46 with respect to the adjusting collar 44 will cause linear motion of the adjusting nut 46 with respect to the adjusting collar 44 along the centerline of the shaft 51.

Slidably positioned on the shaft 51 above the adjusting nut 46 is a lock washer 47. The lock washer 47 engages the adjusting nut 46 and when the lock washer 47 is positioned on the adjusting nut 46 concentric with the shaft 51, the lock washer 47 has an outermost circumference with a radius equal to a radius extending from the centerline of the shaft 51 to one of the plurality of grooves 70 in the adjusting nut 46 and an innermost circumference with a radius substantially equal to the radius of the shaft 51. Extending outward from the outermost circumference of the lock washer 47 are a plurality of outer tabs 73 equally distributed along this outermost circumference. Extending outward from the innermost circumference of the lock washer 47 are two slits 85 which form an inner tab 74. The outer tabs 73 are substantially square with widths substantially equal to the width of the grooves 70 in the adjusting nut 46.

The inner tab 74 is bent downward into the slot 67 and prevents rotational motion about the shaft 51 of the adjusting collar 44 with respect to the lock washer 47. When one of the plurality of outer tabs 73 is bent downward into one of the plurality of grooves 70 in the adjusting nut 46, rotation about the shaft 51 of the adjusting nut 46 with respect to the lock washer 47 is prevented. The result of this positioning of the lock washer 47 with respect to both the adjusting collar 44 and the adjusting nut 46 is that the rotational positions of the adjusting collar 44 and of the adjusting nut 46 with respect to each other are fixed. The particular rotational position of the adjusting nut 46 with respect to the adjusting collar 44 will depend upon the particular outer tab 73 depressed and the particular groove 70 into which it is depressed and this position can be changed by simply raising a depressed outer tab 73 and depressing another into the same or different groove 70.

Slidably positioned on the shaft 51 above the lock washer 47 is a thrust washer 48. The thrust washer 48 engages the lock washer 47 and is concentric with the centerline of the shaft 51. The inner edge 92 of the upper surface of the thrust washer 48 is sloped downward and with the shaft 51 forms a circular channel 90 adjacent to the shaft 51. The thrust washer 48 is in a plane of reference perpendicular to the centerline of the shaft 51 and a groove 91 is formed in the surface of the shaft 51 along that circumference of the shaft 51 adjacent to the channel 90. A retaining ring 49 is placed in the groove 91 with a portion extending beyond the surface of the shaft 51 and into the channel 90. The retaining ring 49 prevents motion of the thrust washer 48 upward along the length of the shaft 51 and the slope of the channel 90 in the thrust washer 48 serves to force the retaining ring 49 firmly into the groove 91 when the thrust washer 48 is forced upward.

Slidably positioned on the shaft 51 within the lower cylindrical cavity 21 and surrounding and concentric with that portion 96 of the inner ring 32 of the lower bearing cone C which extends below the outer ring 31 is a lower grease seal 41. The lower grease seal 41 is above the disc 52 and is similar to the upper grease seal 42 in that it has a metal shell 100 with a circular edge 101 which engages the outer ring 31 of the lower bearing cone C. Similar to the upper grease seal 42, the lower grease seal 41 has a felt ring 103 between discs 120a and 120b. This felt ring 103 engages the shaft 51 and prevents the escape of grease or similar lubricating material from a lubrication chamber defined by the lower grease seal 41 and that portion of the lower cylindrical cavity 21 above the lower bearing cone C. It is in this manner that the roller bearings 33 are lubricated.

The shaft 51 has a groove 110 extending along its side from a point within the hub A and below the upper grease seal 42 to a point above the groove 91 and the retaining ring 49. The width of the groove 110 is substantially the same as the width of the slot 67 in the locking collar 44 and the locking collar 44 is positioned on the shaft 51 with the slot 67 registering with the groove 110 in the shaft 51. A positioning slug 111 is positioned partly in the groove 110 and partly in the slot 67.

The positioning slug 111 is a solid cylinder with a length substantially equal to the widths of the groove 111 and the slot 67 and is positioned in the groove 110 and the slot 67 with its centerline transverse to the groove 110 and the slot 67. Thus, the slug 111 will roll upward and downward in the groove 110. The diameter of the slug 111 is greater than the depth of the groove 110 and as a result, the downward motion of the slug 111 is limited by the lower end of the slot 67 into which the slug 111 extends from the groove 110. The upward motion of the slug 111 is limited by the thrust washer 48 which closes the upper end of the slot 67.

The diameter of the slug 111 insures that regardless of the position of the slug 111 between the lower end of the slot 67 and the thrust washer 48, the slug 111 is always partly in the groove 110 and partly in the slot 67. The result of this arrangement is that the shaft 51 and the adjusting collar 44 must rotate together. The greater length of the groove 110 relative to the length of the slot 67 permits linear motion of the shaft 51 relative to the adjusting collar 44.

*Operation*

With the shaft supporting device assembled as described and with the outer tabs 73 removed from the grooves 70 in the adjusting nut 46, the distance along the centerline of the shaft 51 between the upper washer 43 and the thrust washer 48 is adjustable by rotating the adjusting nut 46 about the adjusting collar 44. Rotation of the adjusting nut 46 in one rotational direction with respect to the adjusting collar 44 causes the adjusting nut 46 to move downward along the length of the adjusting collar 44 and rotation in the opposite direction causes the adjusting nut 46 to move upward along the length of the adjusting collar 44.

The weight of the shaft 51 in the shaft supporting device is supported by the retaining ring 49 and the thrust washer 48 which in turn are supported by the lock washer 47, the adjusting nut 46, the adjusting collar 44, the upper washer 43, the inner ring 29, the roller bearing 30, the outer ring 28, the flange 27 and the shoulder 24. When the adjusting nut 46 moves downward along the length of the adjusting collar 44, the weight of the shaft 51 carried by the thrust washer 48 results in the shaft 51 moving downward with the adjusting nut 46. This shortens the distance between the shoulder 24 and the retaining ring 49. It also moves the disc 52 downward relative to the lower bearing cone C.

When the locking nut 46 moves upward along the length of the adjusting collar 44, the thrust washer 48 moves upward relative to the shoulder 24. This, in turn, forces the retaining ring 49 and the shaft 51 upward relative to the shoulder 24. As the shaft 51 moves upward, the disc 52 forces the edge 53 of the inner ring 32 upward until the upward motion of the inner ring 32 is checked by the roller bearing 33 and by the outer ring 31 engaging the annular ridge 50. This upward motion of the inner ring 32 relative to the outer ring 31 with upward motion of the shaft 51 firmly positions the roller bearings 33 between the rings 31 and 32 and eliminates any tendency, resulting from wear, for the roller bearings 33 to permit linear motion of the rings 31 and 32 with respect to each.

As the shaft 51 moves upward, the weight of shaft 51 forces the inner ring 29 downward relative to the outer ring 28 so as to firmly position the roller bearings 30 between the rings 28 and 29 and eliminate any tendency, resulting from wear, for the roller bearings 30 to permit linear motion of the rings 28 and 29 with respect to each other. Thus, the upward motion of the shaft 51 with rotation of the adjusting nut 46 about the adjusting collar 44 moves the ring 32 toward the ring 31 and the ring 29 toward the ring 28 to eliminate linear motion from both the upper bearing cone B and the lower bearing cone C.

As additional wear of the roller bearings 30 and 33 occurs, the roller bearings 33 will permit upward motion of the inner ring 32 and the shaft 51 relative to the outer ring 31 and the hub A, and the roller bearing 30 will permit downward motion of the inner ring 29 and shaft 51 relative to the outer ring 28 and the hub A. This linear motion of the shaft 51 can be once again eliminated by upward motion of the adjusting nut 46 along the length of the adjusting collar 44 until the ring 32 is moved upward to that degree necessary to insure that the roller bearings 33 are firmly between rings 31 and 32 and the roller bearings 30 are firmly between rings 38 and 29.

The rotational position of the adjusting nut 46 relative to the adjusting collar 44 is fixed using tabs 73 and 74 in the manner already described and can be easily and conveniently changed to provide for increasing wear of the roller bearings 30 and 33. Moreover, when the shaft 51 is initially positioned in the shaft supporting device, the adjusting nut 46 is used to adjust the distance between the edge 53 of the inner ring 32 and the thrust washer 48 to correspond to the distance between the disc 52 and the retaining ring 49. This insures the shaft 51 when initially positioned in the shaft supporting device has no linear motion without requiring close tolerances in the manufacture of the shaft supporting device and in the positioning of disc 52 and retaining ring 49 on the shaft.

It will be obvious that many variations may be made in the embodiment here chosen for the purpose of illustrating the present invention without departing from the scope thereof as defined by the appended claims.

What is claimed as invention is:

1. A device supporting a shaft for rotation about its center line while adjustably restricting motion of the shaft along its center line, said shaft having a disc fixedly attached to one end and said device comprising, in combination, a hub enclosing the shaft with its first end adjacent to said disc and its second end remote from said disc; a first washer encircling the shaft more remote from the disc than the second end of the hub; an annular ridge concentric with the shaft and fixedly positioned within the hub adjacent to the first end of the hub; a shoulder concentric with the shaft and fixedly positioned within the hub adjacent to the second end of the hub; a first bearing cone concentric with the shaft within the hub, said first bearing cone having an outer ring engaging the annular ridge, an inner ring engaging the disc and rotatable with the shaft, and a plurality of roller bearings rotatably positioned between the inner ring and the outer ring with their axes of rotation inclined toward the center line of the shaft and the second end of the hub; a second bearing cone concentric with the shaft within the hub, said second bearing cone having an outer ring engaging the said shoulder, an inner ring engaging and rotatable with the first washer, and plurality of roller bearings rotatably positioned between the inner ring and the outer ring with their axes of rotation inclined toward the center line of the shaft and the first end of the hub; an adjusting collar encircling the shaft, said collar having a threaded outer surface, a first edge engaging the first washer, a second edge more remote from the hub than its first edge and the first washer, and a slot extending through its side from its second edge for a portion of its length; an adjusting nut threadably engaging the outer surface of the adjusting collar, said adjusting nut being movable along the center line of the shaft relative to the adjusting collar by rotation about the adjusting collar and said adjusting nut having a plurality of channels extending the length of its outer surface; a retaining ring in a groove encircling the shaft, said retaining ring having a portion of its diameter extending beyond the surface of the shaft and being more remote from the hub than the adjusting nut; a thrust washer encircling the shaft between the adjusting nut and the retaining ring, said thrust washer having its inner edge adjacent to the shaft inclined toward the first end of the hub to form a channel adapted to receive the extending portion of the retaining ring; a lock washer encircling the shaft between the adjusting nut and thrust washer, said lock washer having an inner tab bent into the slot in the adjusting collar and having a plurality of outer tabs deflectable into the channels of the adjusting nut; a cylindrical slug positioned in the slot of the adjusting collar and in a channel extending along the side of the shaft parallel to its center line; a first seal within the hub between the disc and the roller bearings of the first bearing cone; and a second seal within the hub between the first washer and the roller bearings of the second bearing cone.

2. A device supporting a shaft for rotation about its center line while adjustably restricting motion of the shaft along its center line, said shaft having a disc fixedly attached to one end and said device comprising, in combination, a hub enclosing the shaft with its first end adjacent to said disc and its second end remote from said disc; a first washer encircling the shaft more remote from the disc than the second end of the hub; a ridge concentric with the shaft and fixedly positioned within the hub adjacent to the first end of the hub; a shoulder concentric with the shaft and fixedly positioned within the hub adjacent to the second end of the hub; a first bearing element concentric with the shaft within the hub, said first bearing element having an outer portion engaging the ridge, an inner portion engaging the disc and rotatable with the shaft, and a plurality of bearings rotatably positioned between the inner portion and the outer portion and restricting the motion of the outer portion relative to the inner portion toward the first end of the hub; a second bearing element concentric with the shaft within the hub, said second bearing element having an outer portion engaging the said shoulder, an inner portion engaging and rotatable with the first washer, and a plurality of bearings rotatably positioned between the inner portion and the outer portion and restricting the motion of the outer portion relative to the inner portion toward the second end of the hub; an adjusting collar encircling the shaft, said collar having a threaded outer surface, a first edge engaging the first washer, a second edge more remote from the hub than its first edge and the first washer, and a slot extending through its side from its second edge for a portion of its length; an adjusting nut threadably engaging the outer surface of the adjusting collar, said adjusting nut being movable along the center line of the shaft relative to the adjusting collar by rotation about the adjusting collar and said adjusting nut having a plurality of channels extending the length of its outer surface; a retaining ring in a groove encircling the shaft, said retaining ring having a portion of its diameter extending beyond the surface of the shaft and being more remote from the hub than the adjusting nut; a thrust washer encircling the shaft between the adjusting nut and the retaining ring, said thrust washer having its inner edge adjacent to the shaft inclined toward the first end of the hub to form a channel adapted to receive the extending portion of the retaining ring; a lock washer encircling the shaft between the adjusting nut and thrust washer, said lock washer having an inner tab bent into the slot in the adjusting collar and having a plurality of outer tabs deflectable into the channels of the adjusting nut; and a locking slug positioned in the slot of the adjusting collar and in a channel extending along the side of the shaft parallel to its center line.

3. A device supporting a shaft for rotation about its center line while adjustably restricting motion of the shaft along its center line, said device comprising, in combination, a hub enclosing the shaft and having a first end and a second end; a first washer encircling the shaft adjacent to the second end of the hub; a ridge fixedly positioned within the hub adjacent to the first end of the hub; a shoulder fixedly positioned within the hub adjacent to the second end of the hub; a first bearing element concentric with the shaft within the hub, said first bearing element having an outer portion engaging the ridge, an inner portion rotatable with the shaft and having its position along the center line of the shaft fixed, and a plurality of bearings rotatably positioned between the said inner portion and the said outer portion; a second bearing element concentric with the shaft within the hub, said second bearing element having an outer portion engaging the said shoulder, an inner portion engaging the first washer, and a plurality of bearings rotatably positioned between the said inner portion and the said outer portion; an adjusting collar encircling the shaft, said collar having a threaded outer surface, a first edge engaging the first washer, a second edge more remote from the hub than its first edge and the first washer, and a slot extending through its side from its second edge for a portion of its length; an adjusting nut threadably engaging the outer surface of the adjusting collar, said adjusting nut being movable along the center line of the shaft relative to the adjusting collar by rotation about the adjusting collar and said adjusting nut having a channel extending the length of its outer surface; a retaining ring extending from a groove encircling the shaft, said retaining ring being more remote from the hub than the adjusting nut; a thrust washer encircling the shaft between the adjusting nut and the retaining ring; a lock washer encircling the shaft between the adjusting nut and thrust washer, said lock washer having an inner tab bent into the slot in the adjusting collar and having a plurality of outer tabs deflectable into the channel of the adjusting nut; and a slug positioned in the slot of the adjusting collar and in a channel extending along the side of the shaft parallel to its center line.

4. A device supporting a shaft for rotation about its center line, said device comprising, in combination, a sleeve enclosing the shaft and having a first end and a second end; a first washer encircling the shaft adjacent to the second end of the sleeve; a ridge fixedly positioned within the sleeve adjacent to the first end of the sleeve; a shoulder fixedly positioned within the sleeve adjacent to the second end of the sleeve; a first bearing element having an outer portion engaging the ridge, an inner portion rotatable with the shaft and having a fixed position along the length of the shaft, and a plurality of bearings rotatably positioned between the inner portion and the outer portion; a second bearing element having an outer portion engaging the said shoulder, an inner portion engaging the first washer, and a plurality of bearings rotatably positioned between the inner portion and the outer portion; an adjusting collar encircling the shaft, said collar having a threaded outer surface, a first edge engaging the first washer, a second edge more remote from the sleeve than its first edge and the first washer, and a slot extending through its side from its second edge for a portion of its length; an adjusting nut threadably engaging the outer surface of the adjusting collar, said adjusting nut being movable along the center line of the shaft relative to the adjusting collar by rotation about the adjusting collar; a retaining ring extending from a groove encircling the shaft, said retaining ring being more remote from the sleeve than the adjusting nut; a thrust washer encircling the shaft between the adjusting nut and the retaining ring; a slug positioned in the slot of the adjusting collar and in a channel extending along the side of the shaft parallel to its center line; and means for maintaining the adjusting nut in a fixed rotational position about the adjusting collar.

5. A device supporting a shaft for rotation about its center line, said device comprising, in combination, a sleeve encircling the shaft and having a first end and a second end; a first washer encircling the shaft adjacent to the second end of the sleeve; a ridge fixedly positioned within the sleeve adjacent to the first end of the sleeve; a shoulder fixedly positioned within the sleeve adjacent to the second end of the sleeve; a first bearing having an outer portion engaging the ridge, an inner portion rotatable with the shaft and having a fixed position along the length of the shaft, and a plurality of bearings rotatably positioned between the inner portion and the outer portion; a second bearing element having an outer portion engaging the said shoulder, an inner portion engaging the first washer, and a plurality of bearings rotatably positioned between the inner portion and the outer portion; an adjusting collar encircling the shaft, said collar having a threaded outer surface, a first edge engaging the first washer, and a second edge more remote from the sleeve than its first edge and the first washer; an adjusting nut threadably engaging the outer surface of the adjusting collar, said adjusting nut being movable along the center line of the shaft relative to the adjusting collar by rotation about the adjusting collar; a retaining ring extending from a groove encircling the shaft, said retaining ring being more remote from the sleeve than the adjusting nut; a thrust washer encircling the shaft between the adjusting nut and the retaining ring; and means for maintaining the adjusting nut in one of a plurality of rotational positions about the adjusting collar.

6. A device supporting a shaft for rotation about its center line, said device comprising, in combination, a sleeve encircling the shaft and having a first end and a second end; a first washer encircling the shaft adjacent to the second end of the sleeve; a first bearing element having an outer portion fixedly positioned in the sleeve adjacent to the first end of the sleeve, an inner portion rotatable with the shaft and fixedly positioned along the length of the shaft, and a plurality of bearings rotatably positioned between the inner portion and the outer portion; a second bearing element having an outer portion fixedly positioned in the sleeve adjacent to the second end of the sleeve, an inner portion engaging the first washer, and a plurality of bearings rotatably positioned between the inner portion and the outer portion; an adjusting collar encircling the shaft, said collar having a threaded outer surface, a first edge engaging the first washer, a second edge more remote from the sleeve than its first edge and the first washer; an adjusting nut threadably engaging the outer surface of the adjusting collar, said adjusting nut being movable along the center line of the shaft relative to the adjusting collar by rotation about the adjusting collar; a retaining ring extending from a groove encircling the shaft, said retaining ring being more remote from the sleeve than the adjusting nut; a thrust washer encircling the shaft between the adjusting nut and the retaining ring; and means for maintaining the adjusting nut in one of a plurality of rotational positions about the adjusting collar.

7. A device supporting a shaft for rotation about its center line, said device comprising, in combination, a sleeve encircling the shaft and having a first end and a second end; a first washer slidably encircling the shaft adjacent to the second end of the sleeve; a first bearing element having an outer portion fixedly positioned in the sleeve adjacent to the first end of the sleeve, an inner portion rotatable with the shaft and fixedly positioned along the length of the shaft; a second bearing element having an outer portion fixedly positioned in the sleeve adjacent to the second end of the sleeve, an inner portion rotatable with the shaft and engaging the first washer; a retaining ring extending from a groove encircling the shaft, said retaining ring being more remote from the sleeve than the first washer; a thrust washer encircling the shaft between the first washer and the retaining ring; and means for fixedly adjusting the distance between the first washer and the thrust washer along the length of the shaft.

8. The device as set forth in claim 7 wherein said means for adjusting the distance between the first washer and the thrust washer along the length of the shaft comprises a nut threadedly engaging said inner portion of said second bearing element and bearing against said thrust washer, said nut being effective to move said inner portion of said second bearing element along the length of said shaft upon rotation of said nut with respect to said inner portion of said second bearing element.

9. The apparatus of claim 8 having means for selectively fixing said nut with respect to said inner portion of said second bearing element.

References Cited by the Examiner

UNITED STATES PATENTS 622,041  3/1899  Grant _____ 308—207

FOREIGN PATENTS 682,494  11/1952  Great Britain.

DAVID J. WILLIAMOWSKY, *Primary Examiner.*

FRANK SUSKO, *Examiner.*